United States Patent [19]

Hergenrother et al.

[11] 4,179,554

[45] Dec. 18, 1979

[54] POLYPHOSPHAZENE COPOLYMERS CONTAINING DIALKYL AMINOXY SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 957,399

[22] Filed: Nov. 3, 1978

[51] Int. Cl.$^2$ ............................................. C08G 79/04
[52] U.S. Cl. ................................. 528/168; 528/374; 528/399; 528/422
[58] Field of Search ................. 528/399, 168, 422, 374

[56] References Cited

U.S. PATENT DOCUMENTS 2,214,769  9/1940  Lipkin .................................. 528/399

*Primary Examiner*—Wilbert J. Briggs, Sr.

[57] ABSTRACT

Polyphosphazene copolymers are prepared which contain units represented by the formulas:

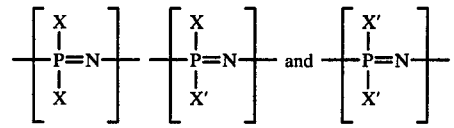

wherein X is —O—NR$_2$ in which R is selected from the group consisting of alkyl groups containing from 1 to 8 carbon atoms, and cycloalkyl groups containing from 3 to 12 ring carbon atoms; and wherein X' is selected from the group consisting of substituted and unsubstituted alkoxy, aryloxy, amino and mercapto groups.

The polymers of the invention can be utilized to form films and may also be utilized in applications such as moldings, coatings and the like.

9 Claims, No Drawings

POLYPHOSPHAZENE COPOLYMERS CONTAINING DIALKYL AMINOXY SUBSTITUENTS

BACKGROUND OF THE INVENTION

This invention relates to polyphosphazene copolymers containing repeating

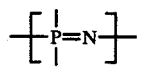

units in the polymer chain in which substituents derived from dialkyl hydroxylamines and other compatible substituents are attached to the phosphorus atom. More particularly, the invention relates to copolymers containing substituents represented by the formula —O—NR$_2$ (defined below) and substituted or unsubstituted alkoxy, aryloxy, amino and mercapto groups.

Polyphosphazene polymers containing repeating

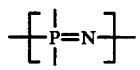

units in which various alkoxy, aryloxy, amino and mercapto groups are attached to the phosphorus atom and their method of preparation are described in the prior art as illustrated in the publication "Nitrogen-Phosphorus Compounds", Academic Press, New York, New York 1972 by H. R. Allcock and "Poly(Organophosphazenes)", Chemtech, Sept. 19, 1975 by H. R. Allcock and in such U.S. Pat. Nos. as 3,515,688; 3,856,712; 3,702,833; 3,974,242 and 4,042,561. H. R. Allcock, W. J. Cook, and D. P. Mack describe preparation of various amine derivatives poly(dichlorophosphazene) in *Inorganic Chemistry*, Vol. 11, 2584 (1972), the disclosures of all these are incorporated herein by reference.

SUMMARY OF THE INVENTION

In accordance with this invention, novel polyphosphazene copolymers are prepared which contain units represented by the formulas:

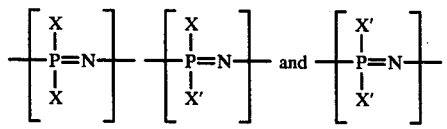

wherein X is —O—NR$_2$ in which R is selected from the group consisting of alkyl groups containing 1 to 8 carbon atoms, and cycloaliphatic groups containing 3 to 12 ring carbon atoms, and X' is selected from the group consisting of alkoxy, aryloxy, amino and mercapto groups.

In the copolymer units represented by the above formulas, all X substituent groups may be the same or they may be mixed and all X' substituent groups may be the same or mixed. In the mixtures, the X substituent groups may be mixtures of different dialkyl aminoxy groups and the X' substituent groups may be mixtures of different alkoxy, aryloxy, amino and mercaptan groups or mixtures within each class.

The specific proportion of X to X' substituent groups incorporated in the copolymers of the invention may vary considerably depending upon chemical and physical properties desired in the copolymer and the particular end use application for which the copolymer is intended. Thus, for applications such as moldings, coatings, foams and the like, the copolymer should contain at least ten (10) percent by weight of the X substituent.

The copolymers are prepared by reacting a poly(dichlorophosphazene) having the formula —(NPCl$_2$)$_n$— in which n is from 20 to 50,000, with a dialkyl hydroxyl amine and a substituted or unsubstituted aliphatic or aromatic alcohol, amino compound or mercaptan compound in the presence of a tertiary amine.

DETAILED DESCRIPTION OF THE INVENTION

I. The Poly(Dichlorophosphazene) Polymer

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula —(NPCl$_2$)$_n$—, in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. The Dialkyl Aminoxy Substituent

Hydroxylamines which may be employed in forming the aminoxy substituent of the copolymers of the invention are those of the formula R$_2$N—OH wherein R is a group selected from alkyl groups containing 1 to 8 carbon atoms, and cycloalkyl groups containing 3 to 12 ring carbon atoms. Representative examples of hydroxylamines which may be suitably employed are diethyl hydroxylamine, dimethyl hydroxylamine, dipropyl hydroxylamine, dibutyl hydroxylamine and the like.

III. The Alkoxy, Aryloxy, Amino and Mercapto Substituents

As indicated heretofore, the polyphosphazene copolymers of the invention in addition to the dialkyl aminoxy substituent group may contain substituted or unsubstituted alkoxy, aryloxy, amino or mercapto groups.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561 as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' for use in these copolymers are substituted or unsubstituted alkoxy and aryloxy groups.

IV. The Tertiary Amine

The use of a tertiary amine in preparing the polymers of the invention is a very important feature. Thus, the use of the tertiary amine minimizes undesirable side reactions and at the same time acts as an effective acid scavenger.

Tertiary amines which may be employed in preparing the polymers of the invention are those represented by the general structure:

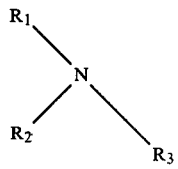

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer with a mixture of a dialkyl hydroxylamine and a substituted or unsubstituted aliphatic alcohol, aromatic alcohol, amino compound or mercaptan compound in the presence of a tertiary amine.

The specific reaction conditions and proportion of ingredients employed in preparing these copolymers can vary somewhat depending on factors such as the reactivity of the specific dialkyl hydroxylamine utilized, the reactivity of the compound or compounds used to form copolymer substituents, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding aminoxy linkages with dialkyl hydroxylamine compounds as well as forming linkages with copolymer substituents.

The above reaction is ordinarily carried out in the presence of a solvent. The solvent employed in the reaction should be a solvent for the poly(dichlorophosphazene) polymer, the dialkyl hydroxylamine, the compounds from which the copolymer substituents are derived and the tertiary amine. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In addition, the materials in the reaction zone should be reasonably free of water. Preferably, the reaction mixture should contain less than about 0.01% by weight of water. The prevention of water in the reaction system is necessary in order to inhibit the reaction of the available chlorine atoms in the chloropolymer therewith.

In general, the amount of the combined total of the dialkyl hydroxyl amine compounds and the copolymer forming compounds employed in the process should be at least molecularly equivalent to the number of available chlorine atoms in the polymer mixture. However, it is preferred that an excess of such compounds be employed in order to insure substantially complete reaction of all the available chlorine atoms.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Optionally, if desired, such unsaturated substituent groups can be utilized in place of the X' substituent groups. Examples of suitable crosslinking moieties and methods for their cure are described in U.S. Pat. Nos. 3,702,833; 3,844,983; 3,888,799; 4,055,520 and 4,061,606, the disclosures of which are hereby incorporated by reference and include unsaturated radicals such as —OCH=CH$_2$; —ORCH=CH$_2$;

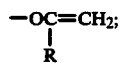

—ORCF=CF$_2$; —OCH$_2$RF=CF$_2$ and —OR$^1$R$^2$ in which R is an aliphatic or aromatic radical, R$^1$ is alkylene or arylene and R$^2$ is vinyl, allyl, crotyl or the like. Generally, when present, the moieties containing cross-linking functionality are usefully present in an amount between 0.1 mole % to about 50 mole % and usually between 0.5 mole % and about 10 mole % based on the replaceable chlorine in the starting poly(dichlorophosphazene).

The following examples are submitted for the purpose of further illustrating the nature of the present invention and are not intended as a limitation on the scope thereof. Parts and percentages referred to in the examples are by weight unless otherwise indicated.

EXAMPLE 1

Preparation of [((C$_2$H$_5$)$_2$NO)(CF$_3$CH$_2$O)PN] Copolymer

To a 10 ounce bottle was added 100 cc of dry tetrahydrofuran (hereinafter "THF"), 12.3 cc of dry triethylamine (88 millimoles), 3.2 cc of trifluoroethanol (44 millimoles) and 4.53 cc of dry diethyl hydroxylamine (44 millimoles). To this solution was added 31.4 gms. of a 14.76 percent solution of a poly(dichlorophosphazene) of a degree of polymerization of 2600 in THF (40 millimoles). The ingredients of the bottle rapidly became opaque and non-fluid. Heating for 20 hours at 80° C. gave a large precipitate and a solution free of phosphazene. The solid was filtered out, washed with water and dried to give 4.7 gms. of a brittle yellow-red solid which appeared to swell in water. The product had a Tg of 38° C. and a peak melting temperature (T$_m$) of 113° C.

An analysis of the polymer product showed the following results:

|  | C | H | N | P | Cl |
|---|---|---|---|---|---|
| Calculated* (%) | 29.21 | 6.08 | 14.58 | 17.65 | 2.73 |
| Actual (%) | 29.21 | 6.08 | 14.58 | 17.65 | 2.73 |

*Based on 9.01% triethylamine hydrochloride, 0.67% unreacted chloropolymer, 25.35% trifluoroethoxy derivative, 44.85% diethyl hydroxylamine derivative and 20.31% hydrolyzed chloropolymer.

EXAMPLE 2

Preparation of [((C$_2$H$_5$)$_2$NO)(p-ClC$_6$H$_4$O)PN] Copolymer

To a 10 oz. bottle was added 100 cc of dry THF, 12.3 cc (88 millimoles) of dry triethylamine, 4.53 cc (44 millimoles) of dry diethyl hydroxylamine and 4.43 cc (44 millimoles) of p-chlorophenol. To this mixture was added 36.4 grams (40.8 millimoles) of a 13.0 percent solids solution of a poly(dichlorophosphazene) of a degree of polymerization of 2600 in cyclohexane. The reaction mixture was heated for 20 hours at 120° C. At the end of this period, the reaction mixture was subjected to infrared spectroscopy. The IR showed no P-Cl band at 600 cm$^{-1}$ indicating good conversion. The solid portion of the mixture was filtered, washed with water and dried to produce 8.50 grams of brown polymeric plastic.

We claim:

1. A polyphosphazene copolymer containing units represented by the formulas:

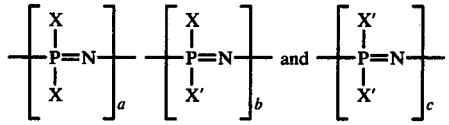

wherein X is —O—NR$_2$ in which R is alkyl containing from 1 to 8 carbon atoms or cycloalkyl containing from 3 to 12 ring carbon atoms; wherein X' is selected from the group consisting of substituted or unsubstituted alkoxy, aryloxy, amino and mercapto groups and wherein 20≦(a+b+c)≦50,000 per polymer.

2. The copolymer of claim 1 wherein X is —ON(CH$_2$CH$_3$)$_2$.

3. The copolymer of claim 1 wherein X is —ON(CH$_2$CH$_3$)$_2$ and X' is —OCH$_2$CF$_3$.

4. The copolymer of claim 1 wherein X is —ON(CH$_2$CH$_3$)$_2$ and X' is —OH$_4$C$_6$Cl-p.

5. A method of preparing polyphosphazene copolymers containing units represented by the formulas:

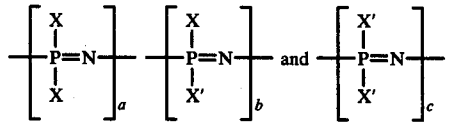

wherein X is —O—NR$_2$ wherein R is alkyl containing from 1 to 8 carbon atoms or cycloalkyl containing from 3 to 12 ring carbon atoms, wherein X' is selected from the group consisting of substituted or unsubstituted alkoxy, aryloxy, amino and mercapto groups and wherein 20≦(a+b+c)≦50,000 per polymer; said method comprising reacting a poly(dichlorophosphazene) polymer having the formula —(NPCl$_2$)$_n$—, wherein n is from 20 to 50,000, with a dialkyl hydroxylamine of the formula R$_2$N—OH in which R is alkyl containing from 1 to 8 carbon atoms or cycloalkyl containing from 3 to 12 carbon atoms and a substituted or unsubstituted aliphatic or aromatic alcohol, an amine compound or mercaptan compound, or mixture thereof in the presence of a tertiary amine.

6. The method of claim 5 wherein said dialkyl hydroxylamine is diethyl hydroxylamine.

7. The method of claim 5 wherein said dialkyl hydroxylamine is diethyl hydroxylamine and said aliphatic alcohol is trifluoroethanol.

8. The method of claim 5 wherein said dialkyl hydroxylamine is diethyl hydroxylamine and said aromatic alcohol is p-chlorophenol.

9. The method of claim 5 wherein said tertiary amine is triethylamine.